United States Patent [19]
O'Brien

[11] 3,814,201
[45] June 4, 1974

[54] V-DRIVE SYSTEM

[75] Inventor: Loren James O'Brien, Ft. Wayne, Ind.

[73] Assignee: Dana Corporation, Toledo, Ohio

[22] Filed: Jan. 21, 1972

[21] Appl. No.: 219,805

[52] U.S. Cl. .................................. 180/44 R, 180/49
[51] Int. Cl. ...................... B60k 23/08, B60k 17/34
[58] Field of Search ......... 180/44 R, 49, 42, 43, 70, 180/53, 54

[56] References Cited
UNITED STATES PATENTS

| | | | |
|---|---|---|---|
| 1,249,160 | 12/1917 | Martwy | 180/44 R |
| 1,258,126 | 3/1918 | Ledbetter | 180/44 R |
| 1,366,536 | 1/1921 | Littlejohn | 180/49 |

Primary Examiner—Philip Goodman
Attorney, Agent, or Firm—Walter E. Pavlick

[57] ABSTRACT

A low vehicle profile is obtained in a front wheel drive system by providing a V-drive axle center section at the rear of a transmission with a pair of forwardly extending V-shaped output or drive shafts. The output shafts are adapted to drive a pair of angled forwardly extending propeller shafts disposed on opposite sides of the center section so that drive can be transmitted to separate gear units located at each front wheel for individually driving the same. Equalization of power between the front wheels is accomplished by means of a conventional bevel gear differential located in one of the output shafts with drive to the differential being through a pinion gear keyed to an adapter sleeve serving as the axle center section input shaft. The front wheel drive system is easily converted into a four-wheel drive system by merely removing the adapter sleeve and inserting in its place a second differential of the worm gear type. By this arrangement input drive is then transmitted to the second differential with the drive divided by the worm gearing in such a manner as to have a portion directed to the first differential located on the center section output shaft and portion directed to a rearwardly extending propeller shaft for driving the rear wheels of the vehicle while still maintaining the desired low vehicle profile.

7 Claims, 6 Drawing Figures

V-DRIVE SYSTEM

BACKGROUND OF THE INVENTION

The present invention relates to front wheel drive motor vehicles in general and more particularly to a V-drive axle center section for such vehicles.

Field of the Invention

A rapidly growing interest in the recreational market has the operators of utility or sport vehicles (passenger cars and light trucks) looking for vehicles with style and comfort in addition to demands for safety and automatic features. Accordingly, the vehicle manufacturer is continually striving to design these vehicles as comfortable, good-looking and easy to drive as the present passenger cars. Currently in this area, customer demands have been for a vehicle having (1) a low silhouette, (2) independent suspension, and (3) ride and handling characteristics of present day passenger cars. Another area of concern has been in the modification of existing two-wheel drive vehicles into four-wheel drive vehicles without resulting in a vehicle which is awkward looking and sometimes unsafe for highway operation.

Description of the Prior Art

Introducing a front drive system in present day vehicles generally requires raising the engine so that the drive trains can be made to clear existing vehicle components to transmit the necessary drive to the front wheels. To solve this problem, "V" drive systems were developed and used in combination with independently suspended half axle assemblies associated with each of the front driving wheels enabling the drive to be directed along both sides of the engine without interferring with the existing engine and transmission.

The present arrangement not only eliminates the need to either raise or move an engine back to provide for the individual drive to each front wheel but also reduces the space normally taken up by such a system in addition to providing a two-wheel drive system which is easily converted into a four-wheel drive system with very little modification.

V-drive axle center sections are well known which provide a differential for each set of wheels (each axle) as shown in U.S. Pat. No. 1,258,126. Also, front wheel drive vehicles per se have been in use for quite some time as evidenced by U.S. Pat. Nos. 1,450,292 and 1,953,749.

Further, V-drive systems wherein each leg or output shaft is adapted to drive a front wheel individually through a differential is well known, devices of this type being shown in U. S. Pat. Nos. 1,476,413 and 3,262,512.

In devices such as this, when transmitting power from a change speed transmission to individual road wheels it is essential that a differential mechanism be incorporated between the angled output shafts and the road wheels in order to achieve the necessary differentiation between the wheels under the various operating conditions encountered. One such device is disclosed in U.S. Pat. No. 1,027,236. However, while operating satisfactorily, this particular arrangement is considerably complicated and costly in that a separate differential unit must be provided in each of the angled drive or output shafts and also for the middle shaft to permit an equalization of power between the (rear) road wheels.

SUMMARY OF THE INVENTION

Stated briefly, the invention comprises a V-drive axle center section which receives drive through an adapter sleeve functioning as the input shaft and delivers this drive, by means of a gear keyed thereto, to a differential unit located in one of the legs of the V. Suitable gearing is provided in the differential to direct power to a pair of split shafts which make up one of the output shafts so that a portion of the power is delivered by one of the split shaft sections directly to one wheel while another portion of the power is delivered by the other split shaft section and thereby carried or distributed around to the other leg of the V to the opposite wheel, thus accomplishing the required differential action between the two wheels.

The two wheel drive is readily converted into a four-wheel drive vehicle by simply replacing the adapter sleeve with a second differential which serves to divide and transmit drive to the first differential located in the one leg of the V and also to the rear wheels through a suitable propeller shaft.

Accordingly, an object of this invention is to provide a two-wheel drive system with a V-drive axle center section which can easily be converted into a four-wheel drive system with the substitution of a second differential.

Another object of this invention is the provision of a more compact V-drive axle center section which results in a lower vehicle silhouette.

It is also an object of this invention to provide a differential unit in one of the output legs of a V-drive axle center section which is capable of receiving the input power from the transmission and differentially dividing it between the front wheels of the vehicle.

Other objects and advantages of this invention will become apparent from the following description of the preferred embodiments of the invention taken together with the accompanying drawings.

FRONT-WHEEL DRIVE SYSTEM

Figure 1:
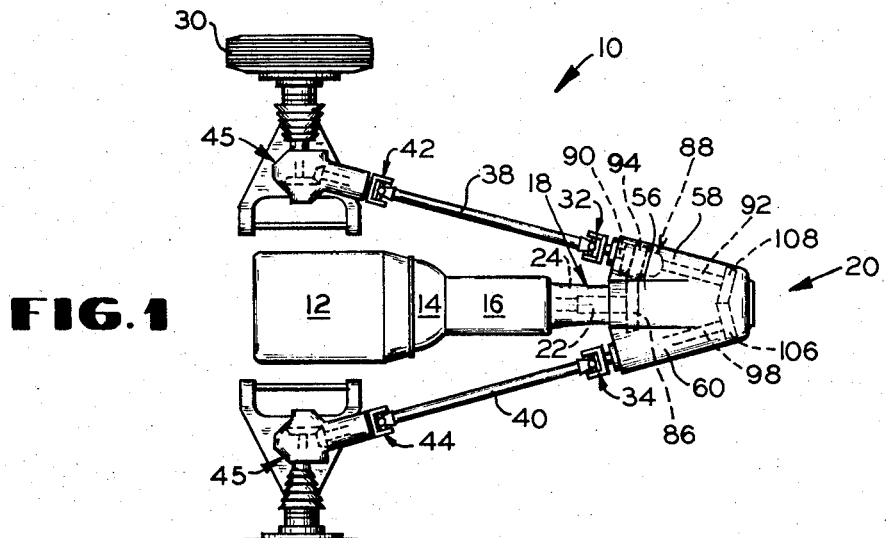
FIG. 1 is a schematic plan view of a front wheel drive vehicle in accordance with the present invention.

Referring to the drawings and more particularly to FIG. 1, a front wheel drive arrangement is shown generally at 10 including a prime mover 12 drivingly connected by a clutch 14 to a transmission 16. A support housing 18 is secured to the rear of the transmission 16 for connection at its rearward end to a V-drive axle center section 20. The axle center section 20 has an input shaft 22, FIG. 2, in the form of an adapter sleeve 22 which receives power from a rearwardly extending transmission output shaft 24 which extends partially into the support housing 18. First and second forwardly extending output shafts, shown generally by the numerals 26 and 28 respectively, make up the legs of the system and are angularly disposed in the axle center section 20 so as to be located on opposite sides of the adapter sleeve or input shaft 22 and extending in a direction outwardly therefrom toward front ground engaging wheels 30—30.

Drive is transmitted from the axle center section 20 to the individual front wheels 30-30 by forwardly extending angularly disposed propeller shafts 38 and 40. The rearward ends of the propeller shafts 38 and 40 are connected by universal joints 32 and 34 respectively while the forward ends are connected by universal joints 42 and 44 respectively to wheel gear boxes 45-45 which, through suitable gearing therein, are adapted to drive the front wheels 30-30. As seen in FIG. 1, the propeller shafts 38 and 40 are constructed and arranged in such a manner as to be located on opposite sides of and lying in substantially the same horizontal plane as the engine and transmission thereby resulting in a very low vehicle silhouette.

Figure 2:
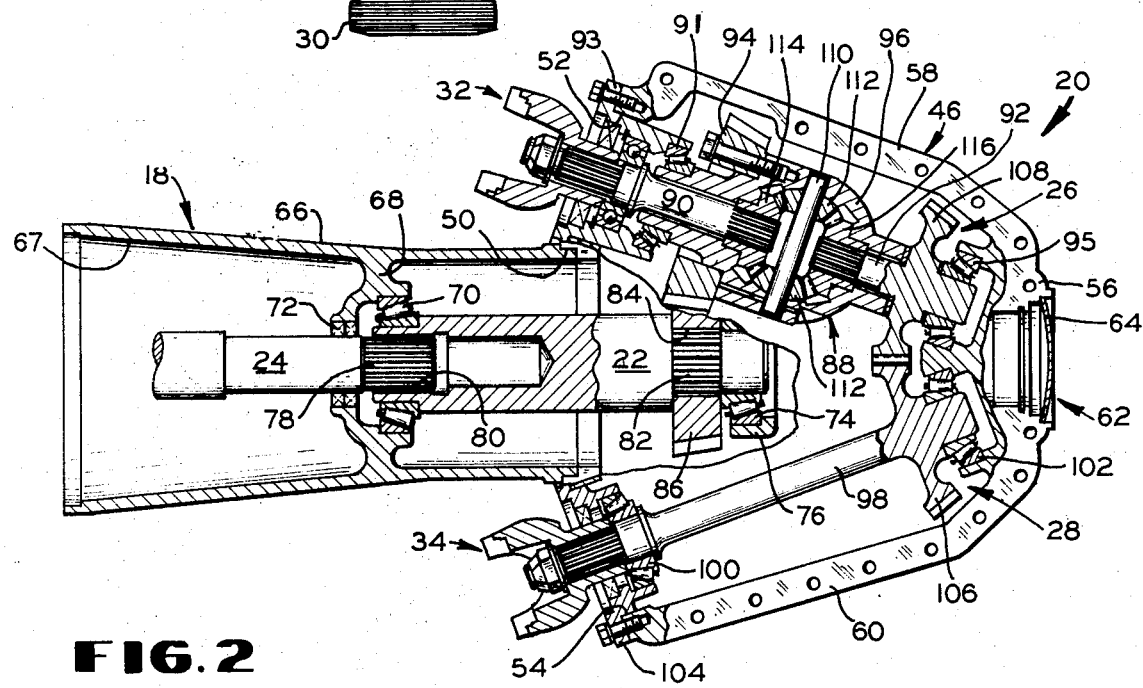
FIG. 2 is an enlarged, partial sectional plan view of the V-drive axle center section shown in FIG. 1 with the upper housing section removed.
Figure 3:
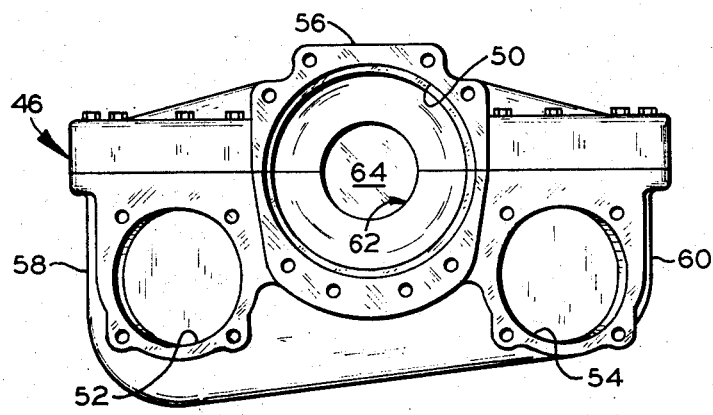
FIG. 3 is a front end view of the axle center section shown in FIG. 2 with the support housing and operating parts removed to indicate the positioning of the various shaft openings.

Referring now more particularly to FIG. 3, it can be seen that axle center section 20 comprises a housing shown generally at 46 of two-piece construction consisting of upper and lower sections bolted together along the peripheral portions thereof. As viewed from the top in FIG. 2, the housing 46 is somewhat V-shaped in configuration including a central body portion 56 in which is supported the adapter sleeve or input shaft 22 and a pair of integrally opposed angularly disposed outwardly extending leg portions 58 and 60 adapted to support the angled output shafts 26 and 28. The rear wall portion of the axle center section 20 has an opening 62 adapted to be in axial alignment with an input opening 50 provided in the front wall thereof but being sealed off by a plug 64 for reasons to be discussed later in the specification. The input receiving opening 50 is provided in the forward portion of the axle center section 20, referring again to FIG. 3, which opening is centrally located with respect to the ends of the leg portions 58 and 60 and positioned so that half of the opening is formed in the upper section and half in the lower section. Also provided at the forward end of the leg portions 58 and 60 of the lower section are a pair of output receiving openings 52 and 54 which are spaced a distance below the horizontal axis of the central input opening 50 and an equal distance on opposite sides of the vertical axis of the central opening 50.

The support housing 18 which forms the connection between the transmission 16 and axle center section 20, comprises a substantially axially elongated tubular case 66 adapted to be bolted to the rear of the transmission 16 in a conventional manner and have the rear portion piloted in the central input receiving opening 50 located at the front wall of the axle center section 20. The case 66 has an opening 67 through which the transmission output shaft 24 and transfer case adapter sleeve or input shaft 22 extend. The mating ends of the shafts meet at a point substantially intermediate the ends of the case 66 at which point an inwardly extending integral annular boss or web 68 is provided in the opening 67 for supporting a bearing 70 and seal 72. The bearing 70 rotatably receives the front end of the input shaft 22 while the seal 72 sealingly engages the adjacent peripheral portion of the output shaft 24. Another bearing 74 is axially spaced to the rear of the bearing 70 and supported in an integral annular boss or web portion 76 formed on the interior of the central body portion 56 for rotatably receiving the rear end of the input shaft 22. To drivingly connect the transmission output shaft 24 to the axle center section input shaft 22 the rearward end portion of the transmission shaft 24 has an externally splined portion 78 for drivingly engaging an internally splined opening 80 in the mating end of the input shaft 22. Also provided on the opposite end of the input shaft 22 is an externally splined portion 82 for drivingly engaging internal splines 84 on a drive or pinion gear 86 which is positioned to the left of the support bearing 74. Alternately, if desired, this connection may vary somewhat, for example, the shaft 22 could have an externally splined portion engageable with an internally splined opening in the rearward end of the transmission ouput shaft 24.

To deliver this power to the propeller shafts 38 and 40 so that the drive can be distributed to the front wheels 30—30 through the wheel gear boxes 45—45, a gear train is provided in the axle center section 20 for receiving power from the drive or output pinion gear 86. This is accomplished by forming a driving connection between the output pinion gear 86 and one of the angularly disposed output shafts. To this end, reference will now be made to FIG. 2 wherein the components of the gear train are shown in greater detail. It can be seen that the drive or pinion gear 86 is located slightly inward of the front wall of axle center section 20 in axial alignment with opening 50 with the angularly disposed output shafts 26 and 28 angled downwardly from the rear wall portion to the front wall portion of the axle center section 20 so as to be positioned below the centerline of the adapter sleeve or input shaft 22, as will be readily apparent from viewing FIG. 3 and an equal distance outside of the peripheral portion of the drive or pinion gear 86. The pinion gear 86 transmits drive to only one of the output shafts, in this instance, the output shaft 26 with that particular output shaft functioning to distribute the drive around to the opposite output shaft, which is output shaft 28 in this case.

In order to accomplish the above, the output shaft 26 is made of a split shaft construction having a conventional bevel gear differential unit 88 interconnecting and supported on a pair of axially aligned differential output shafts 90 and 92 with the shaft 90 rotatably supported in the opening 52 by a bearing 91 and bearing cap 93 while the outer end of output shaft 92 is rotatably piloted by a bearing 95 in the rear wall of the case 46. A ring gear 94 is secured to the differential case 96 so as to be aligned and in meshing engagement with the pinion gear 86. Accordingly, it can be seen that the differential 88 receives drive from the pinion gear 86 and, through conventional bevel gearing incorporated therein, distributes the drive differentially in opposite directions to the split output shafts 90 and 92.

The opposite output shaft 28 consists of a solid forwardly extending shaft 98 which is rotatably supported in the case 46 at its front and rear ends by suitable bearings 100 and 102 respectively. The front bearing 100 being mounted in a bearing cap 104 secured in the opening 54 provided in the angularly disposed portion 60 of the case 46 with the rear bearing 102 supported in a suitable boss provided in the back wall of the case 46. In order to make it possible to transmit drive from the output shaft 26 to output shaft 28, a bevel gear arrangement is provided comprising a gear 106 integrally constructed on the rear portion thereof adjacent the bearing 102 for constant meshing engagement with a similar gear 108 integrally constructed on the rear differential output shaft 92.

Referring in greater detail to the differential unit 88, it can be seen that it is conventional in nature and includes a compensating bevel gear set which permits equal driving force to be transmitted to both front wheels 30—30 and still permit them to rotate independently if the occasion should arise. The differential unit 88 comprises a cross pin or spider 110 secured in the case 96 so as to be rotatable therewith and adjacent the opposite ends thereof rotatably carrying pinion gears 112—112. These pinions 112—112 are adapted to be in constant meshing engagement with opposed side gears 114 and 116 with the side gear 114 splined to the inner end of the forward output shaft 90 and the other side gear 116 splined to the inner end of the rearwardly extending output shaft 92.

From the foregoing it will be apparent that the axle center section 20 comprising the differential unit 88 and associate ring gear 94, split output shafts 90 and 92, gearing 106 and 108, and the solid shaft 98, provide an axle for driving the set of wheels 30—30.

Further, the axle center section 20 is constructed so as to have a pair of output shafts wherein one of the output shafts comprises the two-pieces 92 and 98, which are at an angle with respect to each other, and the gear means 106 and 108 which drivingly interconnect the same so as to be capable of directing the drive to one of the wheels without interferring with the power transmitting means while the shaft 90 functions as the other output shaft.

Operation

For front wheel drive, torque transfer from the transmission 16 is carried from the transmission output shaft 24 to the adapter sleeve or input shaft 22 of the axle center section 20, and therefrom to the output or pinion gear 86 where it is directed to the angled output shaft 26 by means of the ring gear 94 of the differential unit 88. At this point the differential unit 88 functions in a well known manner through the associate pinions 112-112 and side gears 114 and 116 to deliver drive to the shafts 90 and 92 where the torque is divided between the propeller shafts 38 and 40 to the gearing associated with the wheel gear boxes 45—45 and therefrom to the individual front wheels 30—30 of the vehicle.

FOUR-WHEEL DRIVE SYSTEM

Figure 4:
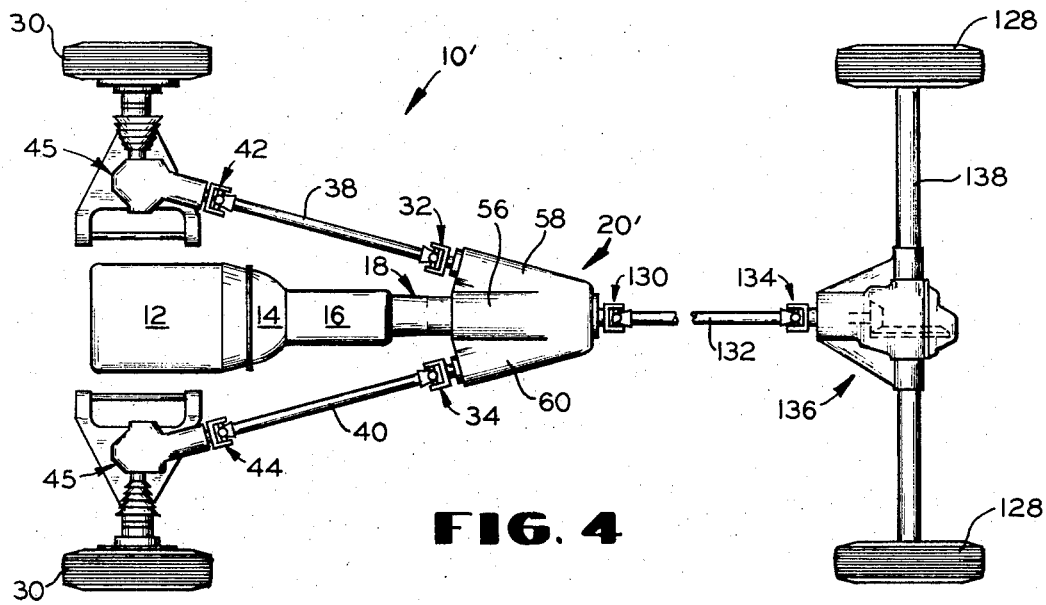
FIG. 4 is a schematic plan view similar to FIG. 1 with the V-drive axle center section converted to a four wheel drive system.

The four-wheel drive unit is shown schematically in FIG. 4 by reference numeral 10' and has a axle center section 20' slightly modified from that shown in FIG. 2 so as to provide a driving connection to a pair of rear ground engaging wheels 128—128. The output connection is in the form of a universal joint 130, at the rear of the axle center section 20', joined by the usual propeller shaft 132 and iniversal joint means 134 to a conventional pinion, ring gear and differential 136 of a rear axle 138 and therethrough to the ground engaging wheels 128—128. The drive to the front wheels 30—30 in this instance is identical to that shown and described in the previous embodiment and accordingly needs no detailed explanation.

Discussion will now be directed to the modification of the existing axle center section 20' and its conversion so that drive can be directed simultaneously to the rear wheels 128—128 and front wheels 30—30. This is accomplished by removing the adapter sleeve or input shaft 22, shown in FIG. 2, and inserting in its place a dual-drive differential of the worm type shown generally by the reference numeral 140 and shown and described in detail in U.S. Pat. No. 2,559,916 to Gleasman. Also, the plug 64 in the rear wall of case 46 is removed from the opening 62 so that drive can be directed therethrough to the rear wheels 128—128.

The differential 140 is of a two-piece construction consisting of a cap portion 142 and a main body portion 144 fixedly connected by a plurality of bolts 146. The differential gear train is located in the body portion 144 and consists of a plurality of worm gears (pinions) 148—148 in constant meshing engagement with a pair of worm gears (side gears) 150 and 152. The forward worm gear 150 is keyed to a rearwardly extending elongated output shaft 154 which extends through and is rotatably carried by a bearing 155 located in the opening 62 of the rear wall portion of the housing 46 and adapted to be coupled to the rear propeller shaft 132 by the universal joint 130. The rear worm gear 152 is keyed to a second output sleeve shaft 156 which is concentrically disposed about the first named output shaft 154 but terminates at the location of the web or boss 76 integral with the interior of the central body portion 56 of the housing 46. This output shaft 156 is rotatably supported in the boss 76 by the identical bearing 74 used to support the adapter sleeve or input shaft 22 in the first described embodiment. An externally splined portion 158 provided on the sleeve 156 drivingly engages the internally splined opening 84 of the drive or pinion gear 86. Again, the pinion gear 86 is identical to that described in connection with the front wheel drive system.

Figure 5:
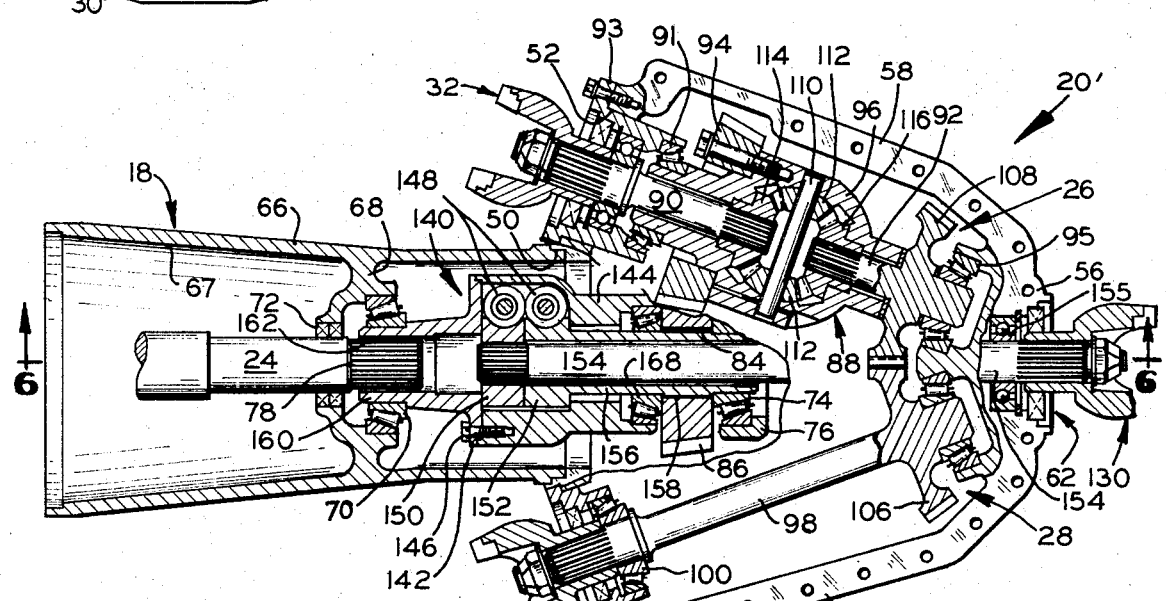
FIG. 5 is an enlarged partial sectional plan view of the V-drive axle center sections shown in FIG. 4 with the upper housing section removed.
Figure 6:
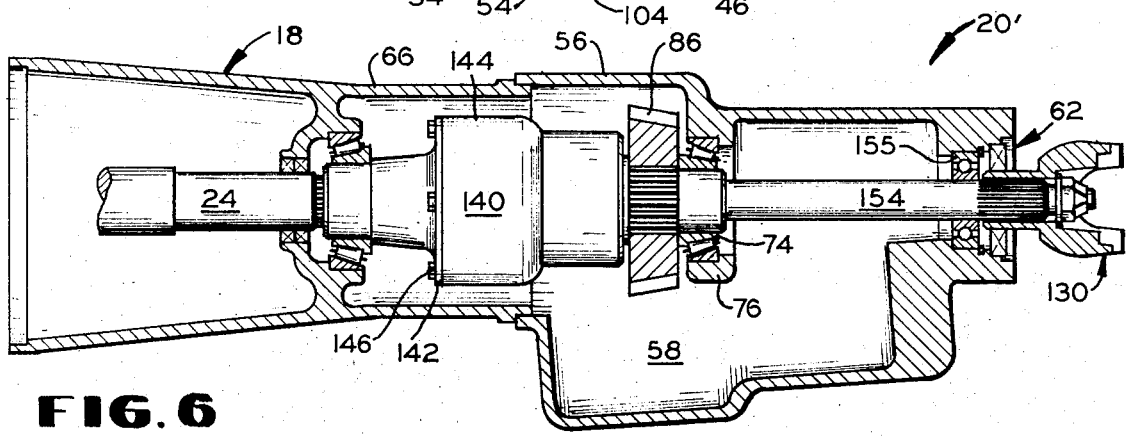
FIG. 6 is a longitudinal side elevational view taken substantially along line 6—6 of FIG. 5 to more clearly show the positioning of the added differential.

It can be seen in FIG. 5 that the cap portion 142 of the differential 140 has an axially extending hub 160 rotatably mounted in the web 68 formed in the opening 67 of the support housing 18 by the identical bearing 70 used to support the front end of the adapter sleeve or input shaft 22 in the first described embodiment. Drive is transmitted to the differential 140 from the transmission output shaft 24 by an internally splined opening 162 provided in the hub 160 which drivingly engages the external splines 78 on the end of the transmission output shaft 24. The body portion 144 is rotatably supported at its rear portion on the outer concentrically arranged output shaft 156 by a bearing 168 with the drive or pinion gear 86 being located between this bearing and the bearing 74 in the web 76 of housing 46. The drive or pinion gear 86 is positioned, as in the first application, to be in constant meshing engagement with the ring gear 94 of the bevel gear differential 88 located in the angled output shaft 26.

From this point on, the structure of the output shafts 26 and 28 is identical in all respects to that previously described and accordingly needs no explanation.

Operation

Drive from the transmission 16 is transmitted from the transmission output shaft 24 to the casing of the second differential 140 by the spline connection 78-162. Drive is then delivered to the worm gears 148—148 where it is divided equally at this point by worm gears 150 and 152 to associate output shafts 154 and 156 respectively where it is then distributed to the front wheels 30—30 by meshing engagement of the drive or pinion gear 86 with the ring gear 94 of the bevel differential 88 and to the rear wheels 128—128 by the universal joint 130 coupling the output shaft 154 to the propeller shaft 132. Resulting from these connections is a drive to all four wheels of the vehicle, with one minor alteration being made to the axle center section disclosed in the first embodiment.

It can be seen that the conversion from two-wheel to four-wheel drive in this system requires merely the removal of the adapter sleeve or input shaft 22 and plug 64 from the opening 62 and insertion of the worm gear differential 140 in order to be able to establish a driving connection to both the front and rear wheels.

From the foregoing, it is apparent that a front-wheel drive vehicle has been described which employs a V-drive axle center section having an axle arrangement which not only provides a low vehicle profile but also one that provides a two-wheel drive vehicle which can be easily converted into a four-wheel drive vehicle merely by substituting a conventional differential for an adapter which forms a part of the original two-wheel drive unit.

Although the present invention has been described in its preferred forms, it is understood that changes in the details may be made without departing from the principles of the invention as defined by the appended claims.

What is claimed is:

1. In a vehicle drive system having a power source and a transmission, the combination comprising;
   a. an axle for driving a set of wheels of the vehicle comprising a differential having a ring gear and a pair of output shafts,
   b. each differential output shaft drivingly connected to a vehicle wheel,
   c. said differential drivingly connecting the two differential output shafts,
   d. power transmitting means including a power source output shaft extending from the power source in one plane and transmitting power from the power source to said ring gear,
   e. said axle being in another plane which is angularly disposed with respect to said one plane,
   f. one of said output shafts being of V-shaped configuration comprising a pair of shafts and gear means interconnecting said pair of shafts for permitting placement of said shafts at a selected angle so as to avoid interference with other vehicle components.

2. The combination of claim 1 wherein said means drivingly connecting said power source output shaft to said axle comprises an input shaft having a pinion gear disposed thereon which is drivingly connected to said ring gear.

3. The combination of claim 1 wherein said means drivingly connecting said power source output shaft to said axle comprises a second differential which also drivingly connects said output shaft to a second axle for driving a second set of wheels of the vehicle.

4. The combination of claim 3 wherein said second differential has an output shaft which is axially aligned with said power source output shaft and is drivingly connected to the second axle.

5. The combination of claim 4 wherein said second differential has a second output shaft co-axial with the other output shaft and has a pinion gear disposed thereon drivingly connected to the ring gear of said first differential.

6. The combination of claim 4 wherein said output shaft of said second differential lies above the first axle.

7. The combination of claim 5 including a pair of angularly disposed propeller shafts each connecting to an output shaft of said first differential for individually driving a wheel of said first set of wheels of the vehicle and another propeller shaft drivingly connected to the first output shaft of said second differential for driving the second set of wheels of the vehicle.

* * * * *